(12) United States Patent
Tsai

(10) Patent No.: US 9,878,779 B2
(45) Date of Patent: Jan. 30, 2018

(54) UNMANNED AERIAL VEHICLE AND LANDING METHOD THEREOF

(71) Applicants:INVENTEC APPLIANCES (PUDONG) CORPORATION, Shanghai (CN); INVENTEC APPLIANCES CORP., New Taipei (TW)

(72) Inventor: Pei-Lun Tsai, New Taipei (TW)

(73) Assignees: INVENTEC APPLIANCES (PUDONG) CORPORATION, Shanghai (CN); INVENTEC APPLIANCES CORP., New Taipei (TW)

( * ) Notice: Subject to any disclaimer, the term of this patent is extended or adjusted under 35 U.S.C. 154(b) by 0 days.

(21) Appl. No.: 15/169,782

(22) Filed: Jun. 1, 2016

(65) Prior Publication Data

US 2017/0267334 A1    Sep. 21, 2017

(30) Foreign Application Priority Data

Mar. 17, 2016   (CN) .......................... 2016 1 0152609

(51) Int. Cl.
*B60C 25/00*     (2006.01)
*B64C 25/10*     (2006.01)
*B64C 27/08*     (2006.01)
*B64C 39/02*     (2006.01)
*B64D 45/04*     (2006.01)
*G06K 9/00*      (2006.01)
*G06T 7/00*      (2017.01)
*H04N 7/18*      (2006.01)

(52) U.S. Cl.
CPC .............. *B64C 25/10* (2013.01); *B64C 27/08* (2013.01); *B64C 39/024* (2013.01); *B64D 45/04* (2013.01); *G06K 9/0063* (2013.01); *G06T 7/0081* (2013.01); *H04N 7/183* (2013.01); *B64C 2201/18* (2013.01)

(58) Field of Classification Search
CPC ....... B64C 25/10; B64C 27/08; B64C 39/024; B64C 45/04; B64C 2201/18; G06K 9/0063; G06T 7/0081; H04N 7/183
See application file for complete search history.

(56) References Cited

U.S. PATENT DOCUMENTS

2016/0272308 A1*   9/2016   Gentry .................... B64C 25/10

\* cited by examiner

*Primary Examiner* — Yuen H Wong
(74) *Attorney, Agent, or Firm* — McClure, Qualey & Rodack, LLP

(57)   ABSTRACT

An unmanned aerial vehicle (UAV) and a landing method thereof are provided. The landing method includes the following steps. Firstly, a depth image of a scene is obtained. Next, a landing position is determined in accordance with the depth image. Next, a height information of the landing position is obtained. Next, a plurality of relative distances of the landing gears relative to the landing position are adjusted in accordance with the height information to make the relative distances substantially the same. Then, the UAV lands on the landing position.

6 Claims, 7 Drawing Sheets

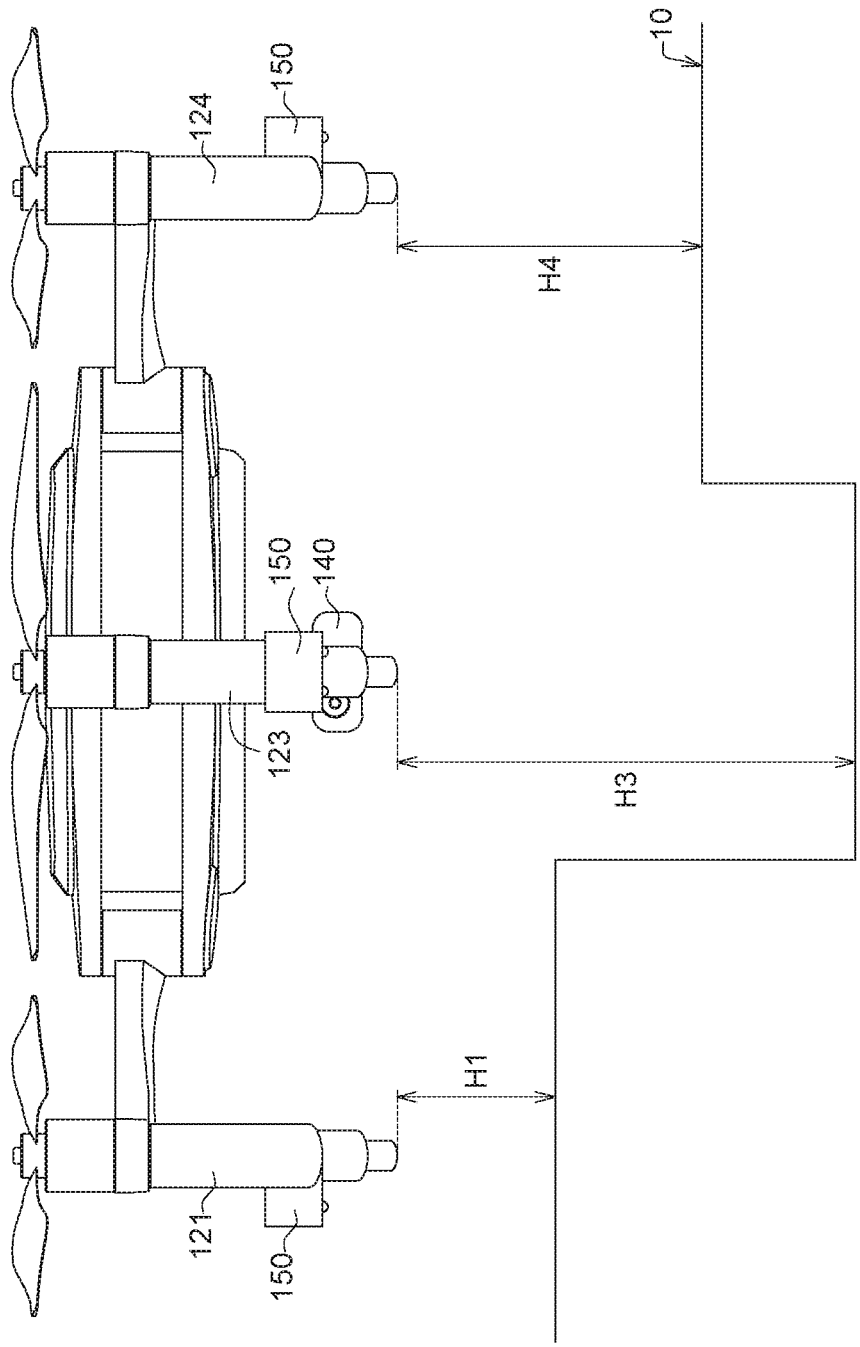

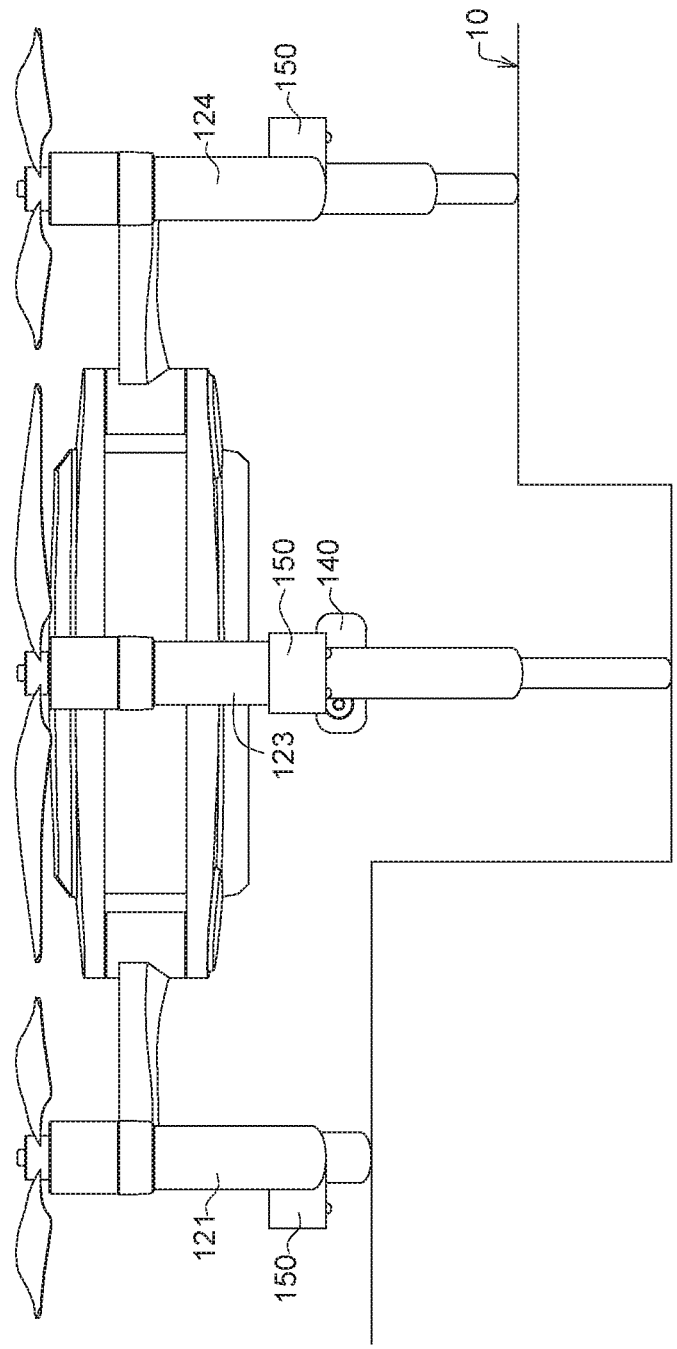

UNMANNED AERIAL VEHICLE AND LANDING METHOD THEREOF

BACKGROUND OF THE INVENTION

This application claims the benefit of People's Republic of China application Serial No. 201610152609.X, filed Mar. 17, 2016, the disclosure of which is incorporated by reference herein in its entirety.

Field of the Invention

The invention relates to an unmanned aerial vehicle and a landing method thereof, and more particularly to an unmanned aerial vehicle capable of landing steadily even on a relatively steep terrain and a landing method thereof.

Description of the Related Art

The unmanned aerial vehicle (UAV) refers to an aerial vehicle without any pilot therein. The UAV can fly via control or fly automatically, and land on different environments to perform a number of tasks. However, if the place where the UAV is going to land belongs to a relatively steep terrain, such as a stairway, a bumpy ground, a steep cliff and so on that have a larger level drop, it is possible to cause the UAV to topple over or even drop and be broken when the UAV lands due to the level drop of the terrain.

SUMMARY OF THE INVENTION

The invention is directed to a UAV and a landing method thereof. The UAV will first search for a suitable landing position before landing, so as to prevent itself from toppling over resulted from the larger level drop while being landing.

According to one aspect of the present invention, a landing method of a UAV is provided. The method includes the following steps. Firstly, a depth image of a scene is obtained. Next, a landing position is determined in accordance with the depth image. Next, a height information of the landing position is obtained. Next, a plurality of relative distances of the landing gears relative to the landing position are adjusted in accordance with the height information to make the relative distances substantially the same. Then, the UAV lands on the landing position.

According to another aspect of the present invention, a UAV is provided. The UAV includes a fuselage, a plurality of landing gears disposed on the fuselage, a 3D image recognition system disposed on the bottom of the fuselage for obtaining a depth image of a scene, a processing unit coupled to the 3D image recognition system for determining a landing position in accordance with the depth image, and a plurality of distance sensing units respectively disposed on the landing gears for obtaining a height information of the landing position. The processing unit adjusts a plurality of relative distances of the landing gears relative to the landing position in accordance with the height information to make the relative distances substantially the same, and lands the UAV on the landing position.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIGS. 6A-6C are schematic diagrams showing the landing of the UAV according to an embodiment of the present invention.

DETAILED DESCRIPTION OF THE INVENTION

Figure 1:
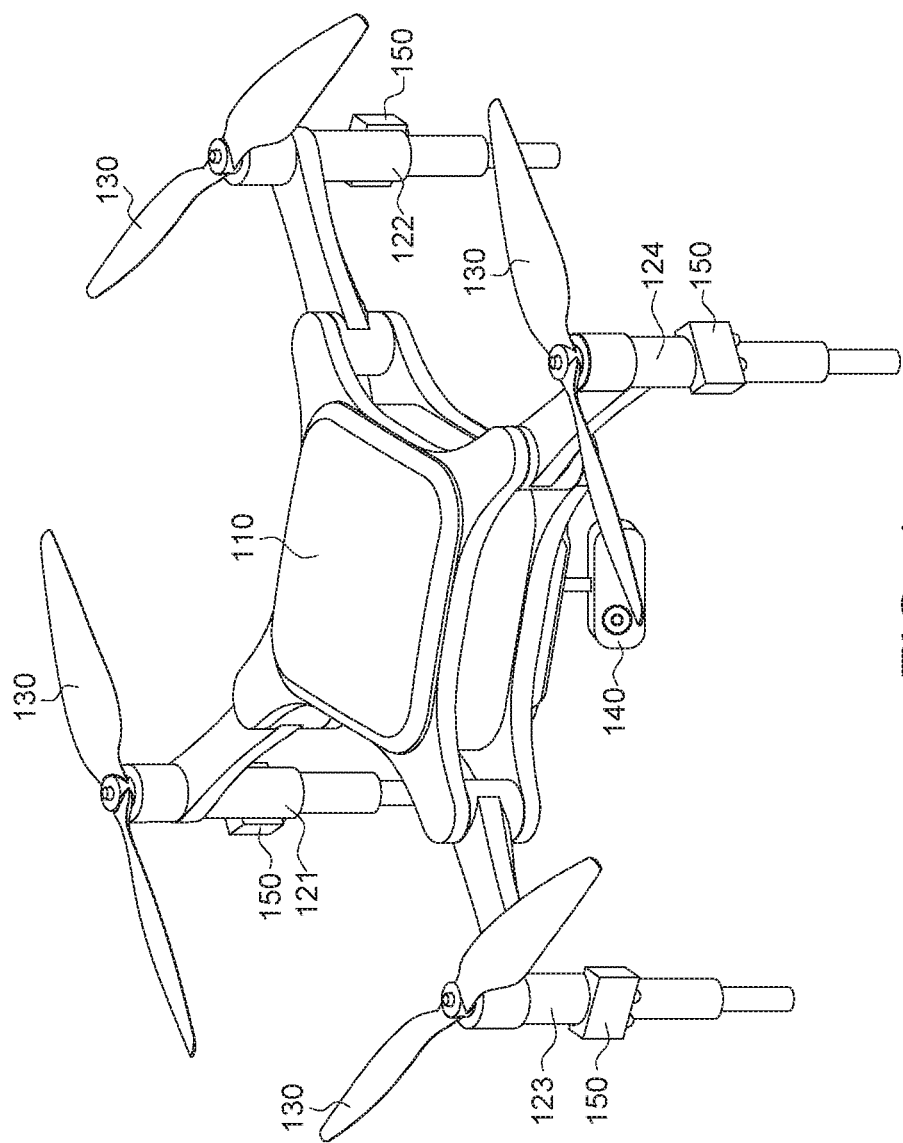
FIG. 1 is a perspective view of a UAV according to an embodiment of the present invention.

Various embodiments are provided and described in detail as follow. The embodiments are merely described for being an example, but do not limit the scope of the present invention. In addition, in order to clearly show the technical features of the present invention, parts of elements are omitted in the drawings of the embodiments.

Refer to FIG. 1. FIG. 1 is a perspective view of a UAV 100 according to an embodiment of the present invention.

The UAV 100 includes a fuselage 110, a plurality of landing gears 121, 122, 123 and 124, a plurality of whirl wing structures 130, a 3D image recognition system 140 and a plurality of distance sensing units 150. The 3D image recognition system 140 may be disposed on the bottom of the fuselage 110 for obtaining a depth image of a scene, and may be capable of capturing a 2D image of the scene. The landing gears 121, 122, 123 and 124 and the whirl wing structures 130 are assembled together and disposed on the fuselage 110. Each of the landing gears 121, 122, 123 and 124 may respectively correspond to one of the whirl wing structures 130. The distance sensing units 150, such as the infrared sensors, are used to obtain a height information of the landing position and respectively disposed on the landing gears 121, 122, 123 and 124. The landing gears 121, 122, 123 and 124 with a telescopic function may be specifically designed as screw rods, sleeves and so on, which are controlled to lengthen or shorten by an element such as a stepping motor. The numbers of the landing gears, the whirl wing structures and the distance sensing units of the UAV 100 as shown in FIG. 1 are all four, but the present invention does not limit thereto. The numbers of the landing gears, the whirl wing structures and the distance sensing units may be three or more than four.

Figure 2:
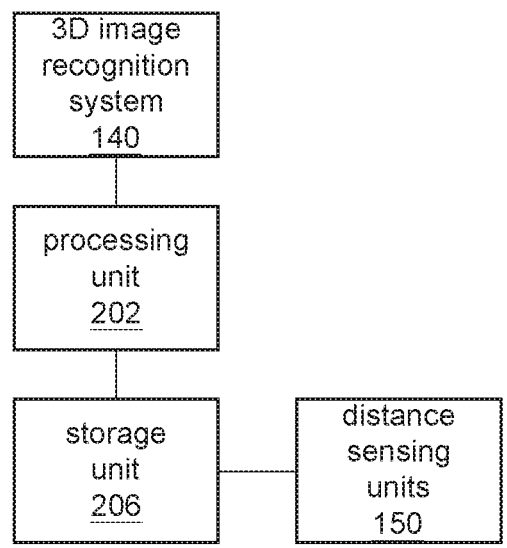
FIG. 2 is a block diagram of the UAV according to an embodiment of the present invention.

Refer to FIG. 2. FIG. 2 is a block diagram of the UAV 100 according to an embodiment of the present invention.

The UAV 100 further includes a processing unit 202 and a storage unit 206. The storage unit 206 is used to store the height information of the landing position obtained from the distance sensing units 150, such as a memory. The processing unit 202 is coupled to the 3D image recognition system 140 and the storage unit 206 for determining a landing position in accordance with the depth image obtained from the 3D image recognition system 140. In addition, the processing unit 202 may further control and adjust the length of each of the landing gears 121, 122, 123 arid 124 respectively in accordance with the height information stored in the storage unit 206. The processing unit 202 may be, for example, a microprocessor or a microcontroller.

Figure 3:
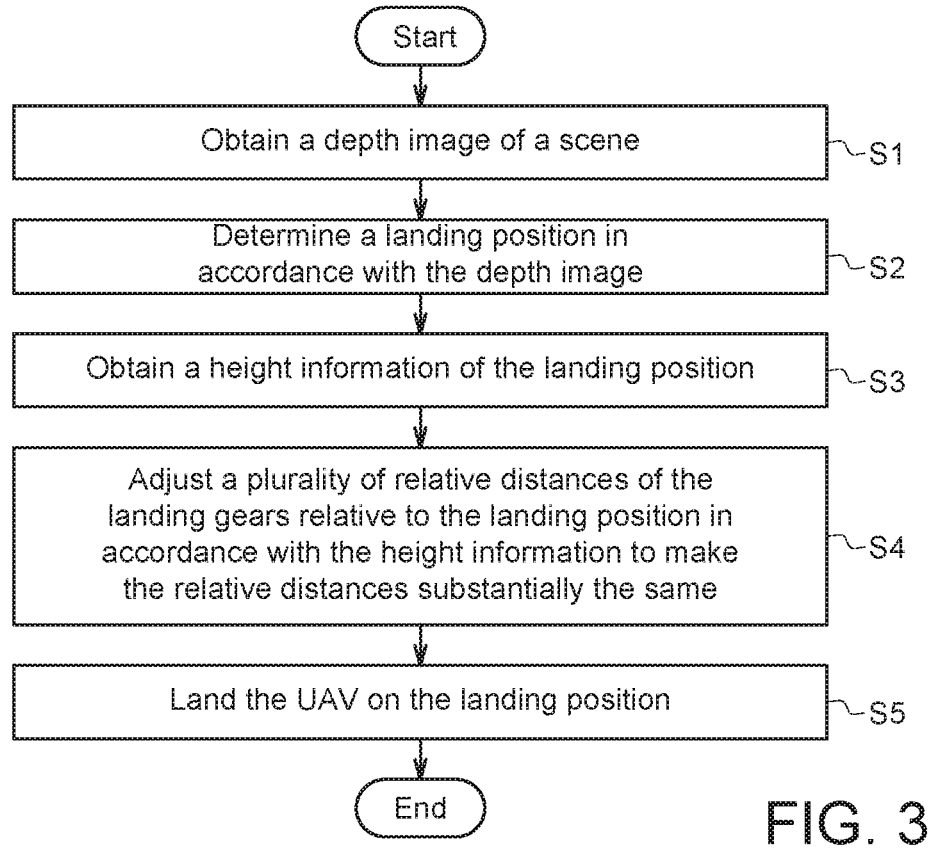
FIG. 3 is a flow chart of a landing method of the UAV according to an embodiment of the present invention.

Refer to FIG. 3. FIG. 3 is a flow chart of a landing method of the UAV according to an embodiment of the present invention. In the present embodiment, the UAV 100 of FIGS. 1-2 is exemplarily used for describing these steps of flow process.

In step S1, the 3D image recognition system 140 obtains a depth image of a scene. The 3D image recognition system 140 may capture 2D images of different scenes, and perform processing to the 2D images to obtain a depth information of the 2D image, so as to obtain the depth image of the scene.

Figure 4:
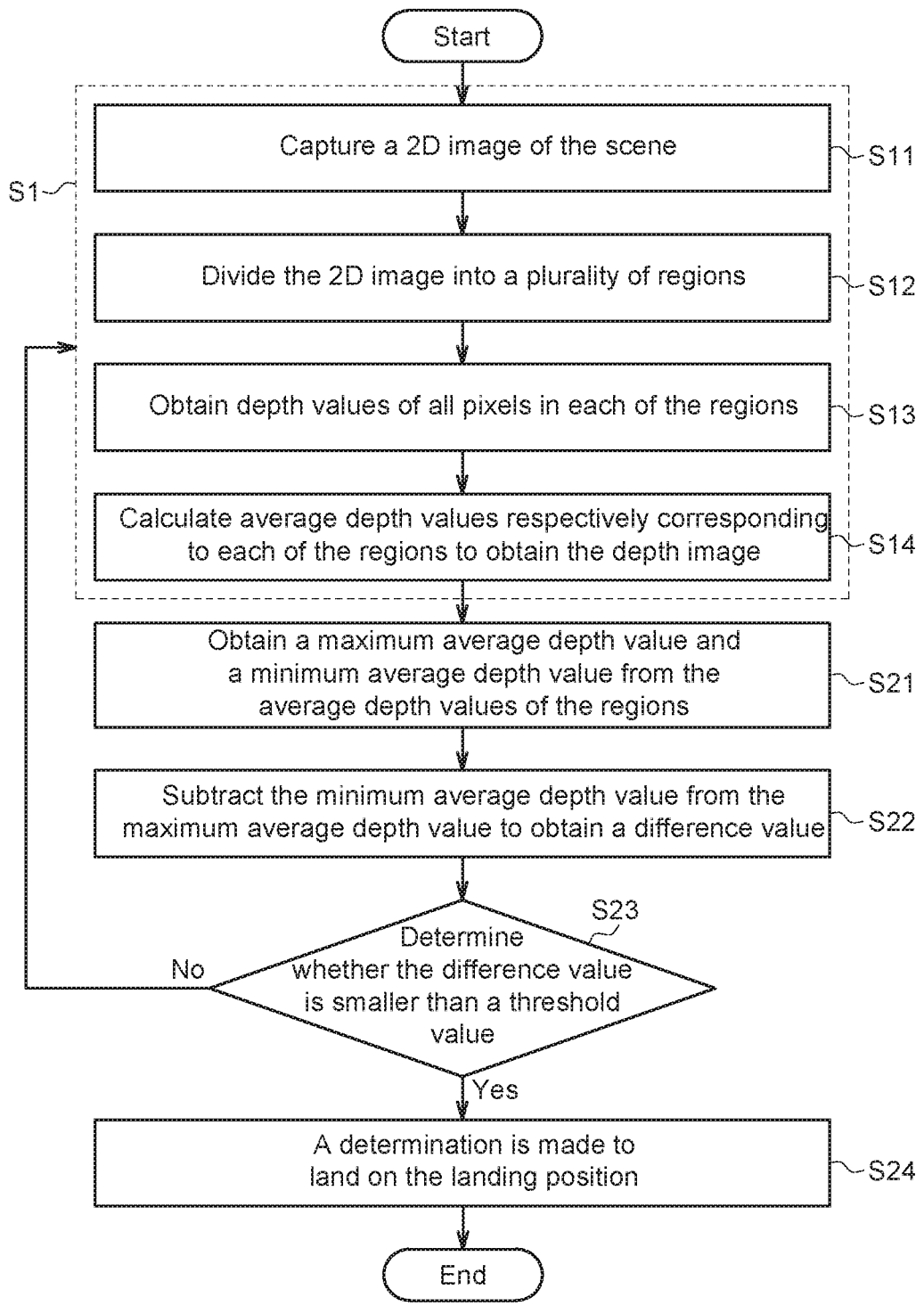
FIG. 4 is a part of flow chart of the landing method of the UAV according to another embodiment of the present invention.
Figure 5:
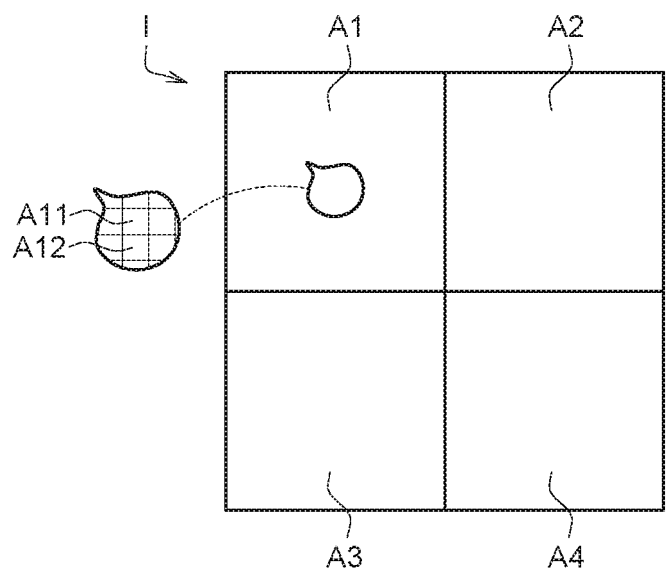
FIG. 5 is a schematic diagram of a 2D image according to another embodiment of the present invention.

Refer to FIGS. 4 and 5. FIG. 4 is a part of flow chart of the landing method of the UAV according to another embodiment of the present invention. FIG. 5 is a schematic diagram of a 2D image according to another embodiment of the present invention.

For instance, in step S11, the image capturing unit in the 3D image recognition system 140 (such as a camera or a video camera) captures a 2D image I of the scene. The image capturing unit may capture the 2D image I of the scene in accordance with different shooting angles (e.g., swinging the lens of the image capturing unit) and shooting ranges (e.g., controlling the lens of the image capturing unit to zoom in or zoom out).

Next, in step 512, the 3D image recognition system 140 divides the 2D image I into a plurality of regions, such as region A1, region A2, region A3 and region A4. In one embodiment, the number of the regions being divided may correspond to the number of the landing gears of the UAV.

In step S13, the 3D image recognition system 140 obtains depth values of all pixels in each of the regions A1, A2, A3 and A4. For example, in region A1, there are pixels A11, A12, ..., A1n contained therein. The 3D image recognition system 140 may depend on the color depth in each of the pixels A11, A12, ..., A1n to recognize and obtain corresponding depth values D1n of all the pixels A11, A12, ..., A1n, wherein n is an integer equal to or larger than 1.

In step S14, the 3D image recognition system 140 calculates average depth values respectively corresponding to each of the regions A1, A2, A3 and A4 to obtain the depth image. In case of region A1 the 3D image recognition system 140 calculates average values of all the depth values D1n to obtain an average depth value D1 of region A1. On this basis, the 3D image recognition system 140 respectively calculates average depth values D2, D3 and D4 of the regions A2, A3 and A4, so as to obtain the depth image of the captured scene.

Refer to FIG. 3. After the step S1 of obtaining the depth image of the scene, the method proceeds to step S2. In step S2, the processing unit 202 determines a landing position in accordance with the depth image.

Refer to FIG. 4. In step S21, the processing unit 202 obtains a maximum average depth value $D_{MAX}$ and a minimum average depth value $D_{MIN}$ from the average depth values D1, D2, D3 and D4 of the regions A1, A2, A3 and A4, respectively. For instance, among the four regions A1, A2, A3 and A4, the average depth value D3 of the region A3 is the maximum, while the average depth value D1 of the region A1 is the minimum. As a result, D3 is the maximum average depth value $D_{MAX}$, and D1 is the minimum average depth value $D_{MIN}$.

In step S22, the processing unit 202 subtracts the minimum average depth value $D_{MIN}$ from the maximum average depth value $D_{MAX}$ to obtain a difference value $D_{DIFF}$=D3−D1.

In step S23, the processing unit 202 determines whether the difference value $D_{DIFF}$ is smaller than a threshold value. When the processing unit 202 determines that the difference value $D_{DIFF}$ is smaller than the threshold value, the method proceeds to step S24, that is, the processing unit 202 determines to land the UAV on the landing position. When the processing unit 202 determines that the difference value $D_{DIFF}$ is larger than the threshold value, the processing unit 202 determines the 3D image recognition system 140 to re-obtain a depth image of a scene, that is, the method proceeds back to step S1 to search for a suitable landing position.

In one embodiment, the threshold value of step S23 may be a maximum telescopic length of each of the landing gears 121, 122, 123 and 124. That is, before landing, the UAV will first search for a suitable landing position where the UAV can land steadily. If the first found landing position has a level drop that is larger than a maximum telescopic length of each of the landing gears 121, 122, 123 and 124 so that the UAV cannot keep a balance or may even topple over, the UAV will continue to find another landing positions.

Refer to FIG. 2. After the step S2 of determining the landing position in accordance with the depth image, the method proceeds to step S3. In step S3, the distance sensing units 150 obtain a height information of the landing position, and store the height information in the storage unit 206.

In one embodiment, when determining to land the UAV on the landing position, the processing unit 202 orders the UAV to fly to the landing position, and aims each of the landing gears 121, 122, 123 and 124 to correspond to each of the regions A1, A2, A3 and A4. In this embodiment, the distance sensing units 150 are, for example, infrared sensors for sensing distance. The distance sensing units 150 are respectively disposed in the landing gears 121, 122, 123 and 124 for obtaining a height information of the landing position corresponding to each of the regions A1, A2, A3 and A4. The infrared sensor includes an emitting end for emitting an infrared light to the ground and a receiving end for receiving the infrared light reflected from the ground. During the traveling of the infrared light, an energy attenuation will be generated. The infrared sensors may respectively obtain current heights relative to the ground of each of the landing gears 121, 122, 123 and 124 according to the energy attenuation, so as to obtain the height information of the landing position, and store the height information in the storage unit 206.

Next, after the step S3 of obtaining the height information of the landing position, the method proceeds to step S4. In step S4, the processing unit 202 adjusts a plurality of relative distances of the landing gears 121, 122, 123 and 124 relative to the landing position in accordance with the height information to make the relative distances substantially the same.

In one embodiment, the processing unit 202 may lengthen or shorten the length of each of the landing gears 121, 122, 123 and 124 respectively in accordance with the height information stored in the storage unit 206 to make the relative distances of the landing gears 121, 122, 123 and 124 substantially the same.

Next, after the step S4 of adjusting the relative distances of the landing gears 121, 122, 123 and 124 relative to the landing position, the method proceeds to step S5. In step S5, the processing unit 202 orders the UAV 100 to land on the landing position. Because the relative distances of the landing gears 121, 122, 123 and 124 relative to the landing position have been adjusted substantially the same in the step S4, the processing unit 202 may order the UAV 100 to land in such a straightly downward way that the landing gears 121, 122, 123 and 124 can touch the ground simultaneously to keep the balance during landing.

Figure 6B:
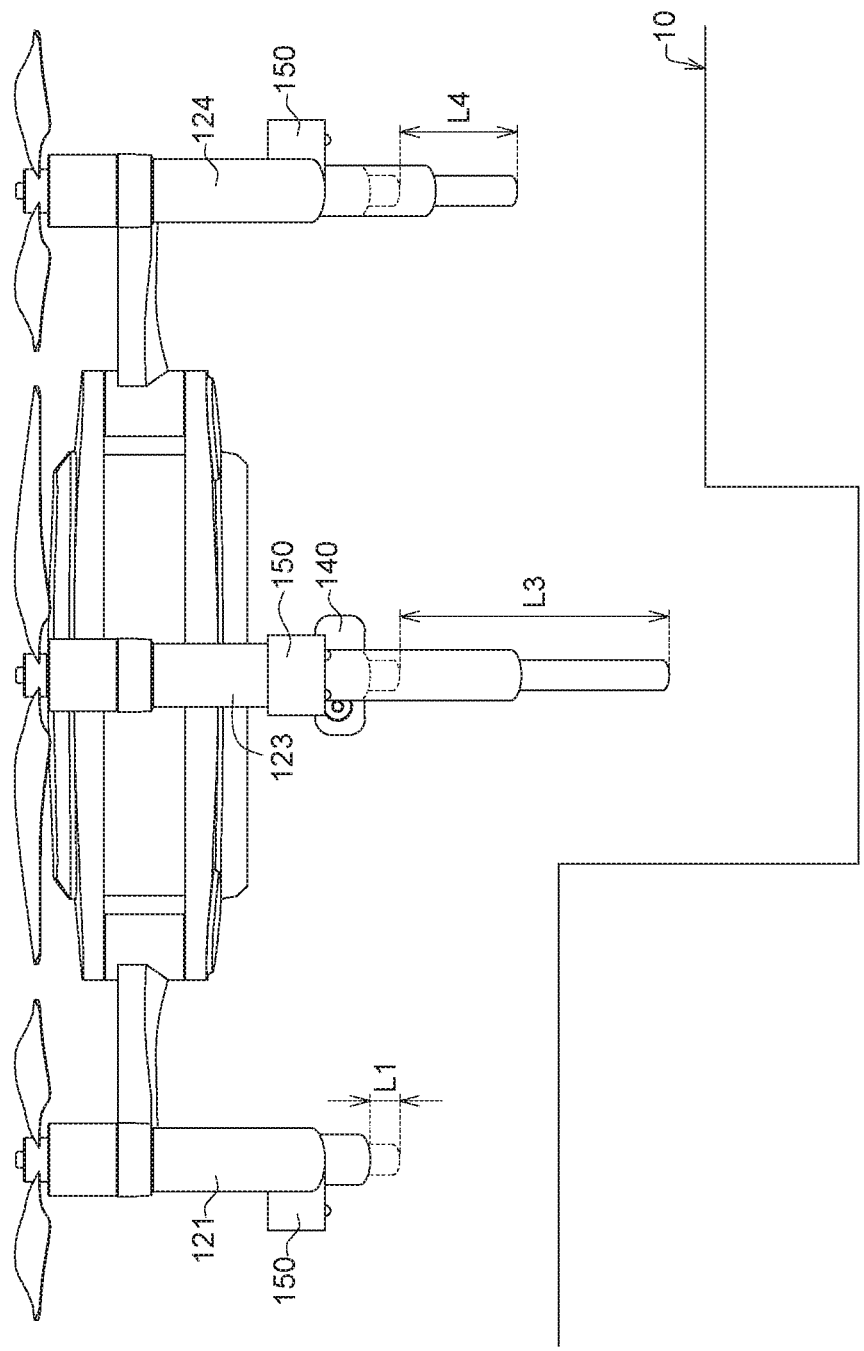

FIGS. 6A-6C are schematic diagrams showing the landing of the UAV according to an embodiment of the present invention. FIGS. 6A-6C are exemplarily used for describing the landing process of the steps S3 to S5. In the present embodiment, the UAV 100 of FIGS. 1-2 is exemplarily used for describing these steps of landing process.

Refer to FIG. 6A. When the UAV 100 confirms a landing position 10, the distance sensing units 150 respectively disposed on the landing gears 121, 122 (not shown), 123 and 124 obtain a height information of the landing gears 121, 122, 123 and 124 on the landing position 10. For example, heights relative to the ground H1, H3 and H4 of each of the landing gears 121, 123 and 124 measured by the distance sensing units 150 on the landing gears 121, 123 and 124 are 140 cm, 200 cm and 160 cm, respectively. The heights relative to the ground H1, H3 and H4 are used as the height information of the landing position 10.

Refer to FIG. 6B. After the distance sensing units 150 obtain the height information of the landing position 10, the processing unit 202 depends on the height information to shorten the length L1 of the landing gear 121 by 10 cm, and respectively lengthen the lengths L3 and L4 of the landing gears 123 and 124 by 50 cm and 10 cm. Therefore, the relative distances of the landing gears 121, 123 and 124 relative to the landing position 10 are adjusted to be equal to each other (i.e., 150 cm).

Refer to FIG. 6C. After adjusting the relative distances of the landing gears 121, 123 and 124 relative to the landing position 10, the processing unit 202 controls the UAV 100 to fly downwards by 150 cm on the landing position 10. Finally, the landing gears 121, 123 and 124 may touch the ground simultaneously without losing balance when the UAV 100 lands.

In the landing method of the UAV disclosed in above embodiment of the present invention, the UAV will first search for a suitable landing position before landing, so as to prevent itself from toppling over resulted from the larger level drop while being landing. After finding the suitable landing position, the UAV of the present invention will obtain a height information of the landing position, and then adjust the landing gears in accordance with the height information, and finally land on the landing position. Therefore, the UAV can prevent from toppling over resulted from late calculation of gravity. Moreover, in the step of correspondingly adjusting the landing gears in accordance with the height information, the relative distances of the landing gears relative to the landing position are made all the same. Thus, when the UAV is controlled to land in a straightly downward way, the landing gears can not only touch the ground simultaneously to keep the balance, but also prevent itself from toppling over in the case that any landing gears have not touched the ground while being landing.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An unmanned aerial vehicle (UAV), comprising:
   a fuselage;
   a plurality of landing gears disposed on the fuselage;
   a 3D image recognition system disposed in bottom of the fuselage for obtaining a depth image of a terrain;
   a processor coupled to the 3D image recognition system for determining a landing position in accordance with the depth image; and
   a distance sensing unit disposed in each of the plurality of landing gears for obtaining height information of the landing position, such that a height between each landing gear and the terrain respectively below each landing gear is obtained;
   wherein the processor independently extends or retracts in a vertical direction with respect to the terrain each of plurality of the landing gears to adjust a vertical position of each of the plurality of landing gears, based on the height information obtained, so as to make the distance between each landing gear and the terrain substantially the same, and land the UAV on the landing position in accordance with the depth image.

2. The UAV according to claim 1, wherein the 3D image recognition system captures a 2D image of the terrain, divides the 2D image into a plurality of regions, obtains depth values of all pixels in each of the plurality of regions, and calculates average depth values respectively corresponding to each of the plurality of regions to obtain the depth image.

3. The UAV according to claim 2, wherein the processor obtains a maximum average depth value and a minimum average depth value from the average depth values of the plurality of regions, subtracts the minimum average depth value from the maximum average depth value to obtain a difference value, and determines whether the difference value is smaller than a threshold value;
   wherein when the difference value is smaller than the threshold value, the processor determines to land the UAV on the landing position;
   wherein when the difference value is larger than the threshold value, the processor determines the 3D image recognition system to re-obtain a depth image of a terrain to search for a suitable landing position.

4. The UAV according to claim 3, wherein the threshold value is a maximum extension length of each of the plurality of landing gears.

5. The UAV according to claim 2, wherein the processor aims each of plurality of the landing gears to correspond to each of the plurality of regions.

6. The UAV according to claim 5, wherein the distance sensing units are infrared sensors.

* * * * *